US009516050B2

(12) United States Patent
Koyanagi et al.

(10) Patent No.: US 9,516,050 B2
(45) Date of Patent: Dec. 6, 2016

(54) MONITORING PROPAGATION IN A NETWORK

(71) Applicant: FUJITSU LIMITED, Kawasaki-shi, Kanagawa (JP)

(72) Inventors: Yusuke Koyanagi, Kawasaki (JP); Kenji Kobayashi, Kawasaki (JP); Masazumi Matsubara, Machida (JP); Yoshinori Sakamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 5 days.

(21) Appl. No.: 14/605,437

(22) Filed: Jan. 26, 2015

(65) Prior Publication Data
US 2015/0249676 A1    Sep. 3, 2015

(30) Foreign Application Priority Data

Feb. 28, 2014 (JP) ................................. 2014-039339

(51) Int. Cl.
H04L 29/06    (2006.01)

(52) U.S. Cl.
CPC ....... *H04L 63/1425* (2013.01); *H04L 63/0236* (2013.01); *H04L 63/145* (2013.01); *H04L 2463/121* (2013.01)

(58) Field of Classification Search
CPC ............. H04L 63/1425; H04L 63/0236; H04L 63/145; H04L 2463/121
See application file for complete search history.

(56) References Cited

U.S. PATENT DOCUMENTS

| 8,032,937 | B2 | 10/2011 | Ellis | |
|---|---|---|---|---|
| 8,046,624 | B2 * | 10/2011 | Williamson | .......... G06F 21/566 709/206 |
| 9,183,387 | B1 * | 11/2015 | Altman | ................. G06F 21/554 |
| 2004/0103021 | A1 * | 5/2004 | Scarfe | ..................... H04L 12/26 705/13 |
| 2005/0015624 | A1 * | 1/2005 | Ginter | ..................... G06F 21/55 726/4 |
| 2006/0010389 | A1 * | 1/2006 | Rooney | ............... H04L 63/1425 715/736 |

(Continued)

FOREIGN PATENT DOCUMENTS

| CN | 1848745 A | * 10/2006 |
|---|---|---|
| JP | 2005-175993 | 6/2005 |
| JP | 2008-518323 | 5/2008 |

OTHER PUBLICATIONS

Google English Translation of CN1848745A, pp. 1-4.*

*Primary Examiner* — Theodore C. Parsons
*Assistant Examiner* — James J Wilcox
(74) *Attorney, Agent, or Firm* — Staas & Halsey LLP

(57) ABSTRACT

A non-transitory computer-readable recording medium stores therein a program for causing a computer to execute a process. The process includes obtaining, for each predetermined time period, from packets transmitted in a system, a packet set with a combination of a transmission source and a transmission destination different from a predetermined combination of a transmission source and a transmission destination; extracting, for the each predetermined time period, from the packets transmitted in the system, a related packet related to the obtained packet; generating, based on the extracted related packet, information indicating a degree of propagation; and outputting the generated information.

8 Claims, 19 Drawing Sheets

(56) References Cited

U.S. PATENT DOCUMENTS

| | | | | |
|---|---|---|---|---|
| 2006/0123480 A1* | 6/2006 | Oh | H04L 63/1408 | 726/23 |
| 2006/0288415 A1* | 12/2006 | Wong | H04L 63/145 | 726/24 |
| 2007/0089171 A1* | 4/2007 | Aharon | G06F 21/55 | 726/22 |
| 2007/0115988 A1* | 5/2007 | Miller | H04L 63/0236 | 370/392 |
| 2007/0234424 A1* | 10/2007 | Bu | H04L 63/1425 | 726/22 |
| 2008/0104702 A1* | 5/2008 | Choi | H04L 63/145 | 726/23 |
| 2008/0137542 A1* | 6/2008 | Chiu | H04L 63/1425 | 370/242 |
| 2008/0222729 A1* | 9/2008 | Chen | H04L 63/145 | 726/24 |
| 2008/0313734 A1* | 12/2008 | Rozenberg | H04L 63/1425 | 726/22 |
| 2008/0320075 A1* | 12/2008 | Livshits | H04L 63/145 | 709/203 |
| 2010/0199349 A1* | 8/2010 | Ellis | G06F 21/552 | 726/24 |
| 2012/0278886 A1* | 11/2012 | Luna | G06F 21/552 | 726/22 |
| 2013/0117852 A1* | 5/2013 | Stute | H04L 63/1425 | 726/23 |
| 2014/0095711 A1* | 4/2014 | Kim | H04L 63/1408 | 709/224 |
| 2016/0014146 A1* | 1/2016 | Nakata | H04L 12/6418 | 726/12 |
| 2016/0057166 A1* | 2/2016 | Chesla | H04L 63/02 | 726/23 |
| 2016/0197940 A1* | 7/2016 | Jung | H04L 63/18 | 726/24 |

* cited by examiner

FIG.4

| TRANSMISSION SOURCE IP | TRANSMISSION DESTINATION IP | COMMUNICATION CHARACTERISTIC SERIES ⟨41 |
|---|---|---|
|  |  |  |

FIG.5

| GRAPH ID | UNKNOWN COMMUNICATION CHARACTERISTIC | PROPAGATION GRAPH | LAST UPDATE TIME ⟨42 |
|---|---|---|---|
|  |  |  |  |

FIG.6

| TRANSMISSION SOURCE IP | TRANSMISSION DESTINATION IP | TRANSMISSION DESTINATION PORT | PACKET SIZE | ... |
|---|---|---|---|---|
| 172.16.0.15 | 172.16.0.12 | 22 |  |  |
| 172.16.0.15 | 172.16.0.12 | 80 |  |  |
| 172.16.0.15 | 172.16.0.12 | 22 |  |  |
| 172.16.0.15 | 172.16.0.12 | 25 |  |  |

FIG.21

| GRAPH ID | COMMUNI-CATION CHARAC-TERISTIC TRANS-MISSION SOURCE | COMMUNI-CATION CHARAC-TERISTIC TRANS-MISSION DESTINA-TION | COMMUNI-CATION CHARAC-TERISTIC OBTAIN-MENT TIME | UNKNOWN COMMUNI-CATION CHARAC-TERISTIC | PROPA-GATION GRAPH | LAST UPDATE TIME |
|---|---|---|---|---|---|---|
| | | | | | | |

FIG.22

| TRANSMISSION SOURCE IP | TRANSMISSION DESTINATION IP | UNKNOWN TIME LIST |
|---|---|---|
| | | |

MONITORING PROPAGATION IN A NETWORK

CROSS-REFERENCE TO RELATED APPLICATIONS

This application is based upon and claims the benefit of priority of the prior Japanese Patent Application No. 2014-039339, filed on Feb. 28, 2014, the entire contents of which are incorporated herein by reference.

FIELD

The embodiments discussed herein are directed to a monitoring program, a monitoring method, and a monitoring apparatus.

BACKGROUND

In recent years, cyber attacks, represented by malware, have been increasing. Such cyber attacks, like, for example, zero-day attacks and targeted attacks, have become shrewd and diversified, and even unknown patterns are sometimes used. For example, if an unknown pattern not registered with a security product hacks into a network, by propagating through devices in the network, the unknown pattern may spread inside the system and influence the system.

There are techniques for detecting such unknown patterns. In such a technique, for example, if the number of packets having the same protocol and data portion exceeds a threshold value, the packets are regarded as those transmitted by an unknown worm.

Patent Literature 1: Japanese Laid-open Patent Publication No. 2005-175993
Patent Literature 2: Japanese National Publication of International Patent Application No. 2008-518323.

However, by the above mentioned technique, only the spots where the unknown pattern is detected are found out and it is difficult to grasp a propagation state of the unknown pattern.

SUMMARY

According to an aspect of an embodiment, a non-transitory computer-readable recording medium stores therein a program for causing a computer to execute a process. The process includes obtaining, for each predetermined time period, from packets transmitted in a system, a packet set with a combination of a transmission source and a transmission destination different from a predetermined combination of a transmission source and a transmission destination; extracting, for the each predetermined time period, from the packets transmitted in the system, a related packet related to the obtained packet; generating, based on the extracted related packet, information indicating a degree of propagation; and outputting the generated information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a data configuration of inter-node characteristic information;

FIG. 5 is a diagram illustrating an example of a data configuration of propagation graph information;

FIG. 6 is a diagram illustrating an example of packets;

FIG. 21 is a diagram illustrating an example of a data configuration of propagation graph information;

FIG. 22 is a diagram illustrating an example of a data configuration of unknown communication information;

DESCRIPTION OF EMBODIMENTS

Hereinafter, embodiments of a monitoring program, a monitoring method, and a monitoring apparatus according to the present invention will be described in detail based on the drawings. The invention is not limited by these embodiments. The respective embodiments may be combined with one another as appropriate, so long as no contradiction arises in the processed contents.

First Embodiment

[a] First Embodiment

Figure 1:
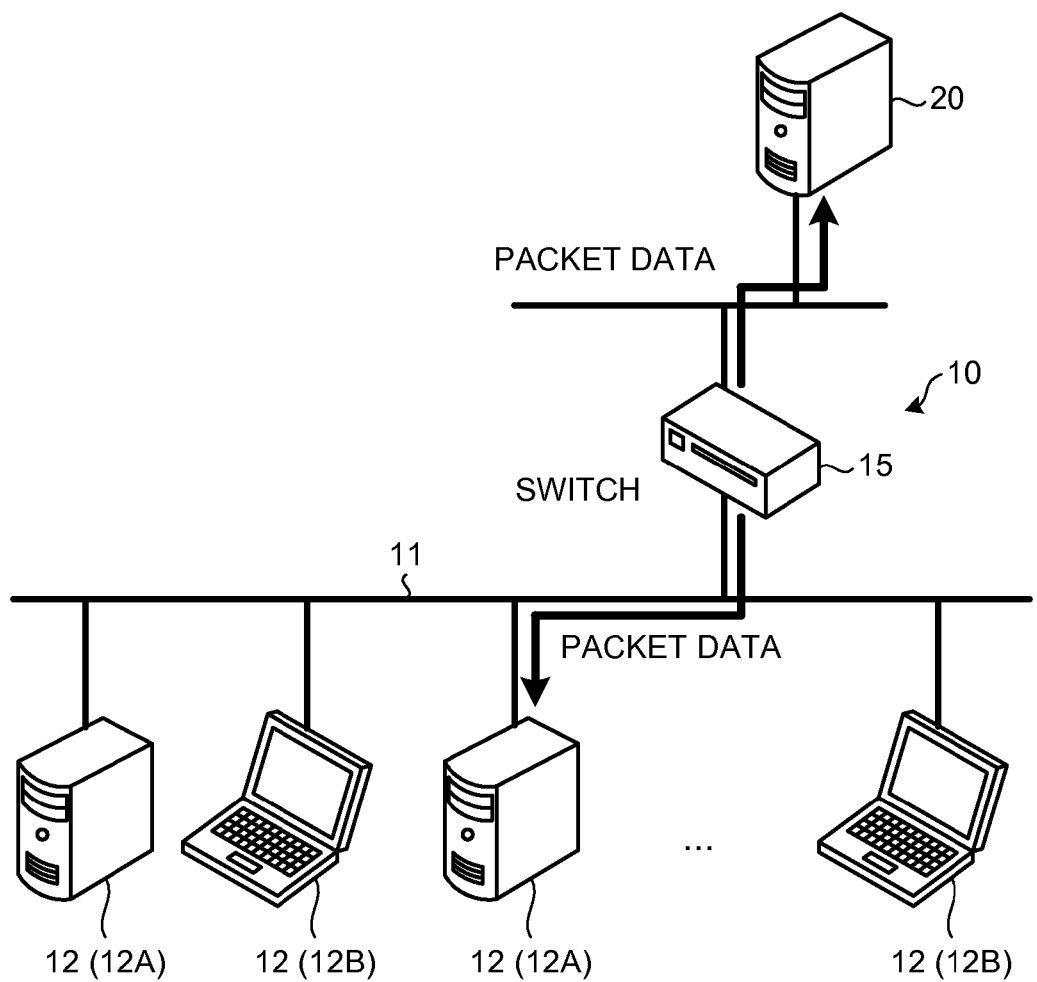
FIG. 1 is a diagram illustrating an example of a schematic configuration of a monitoring target system.

Configuration of Monitoring Target System First, a configuration of a monitoring target system 10 that monitors propagation of an unknown pattern according to a first embodiment will be described. FIG. 1 is a diagram illustrating an example of a schematic configuration of the monitoring target system. As illustrated in FIG. 1, in the monitoring target system 10, various communication devices 12 are communicatably connected to a network 11. This monitoring target system 10 is, for example, an intra-company network. In the example of FIG. 1, two servers 12A and two notebook type personal computers (PC) 12B, which are the communication devices 12, are connected to the network 11. The communication devices 12 are not limited to this example, and may be any of devices, such as, for example, routers and gateways, which communicate packets. The example of FIG. 1 includes four communication devices 12, but the disclosed system is not limited to this example and may include any number of communication devices 12. The various communication devices 12 transmit and receive data to and from the other communication devices 12 via the network 11.

A switch 15 that relays data is provided in the network 11. In the example of FIG. 1, one switch 15 is illustrated, but a plurality of switches 15 are provided therein. In this embodiment, a function of mirroring and transmitting packets of the relayed data to a monitoring apparatus 20 is provided in the switch 15. The switch 15 mirrors and transmits, to the monitoring apparatus 20, the packets of the data transmitted and received among the connected communication devices 12. For example, the switch 15 copies a packet transmitted and received between the communication devices 12, and transmits a packet having a data portion storing therein data of the copied packet, to the monitoring apparatus 20. As a result, all of packets flowing in the network 11 are transferred to the monitoring apparatus 20. The monitoring apparatus 20 may be provided in the network 11 or may be provided outside the network 11. In the example of FIG. 1, the monitoring apparatus 20 is provided in the network 11.

Configuration of Monitoring Apparatus.

Figures 2, 3:
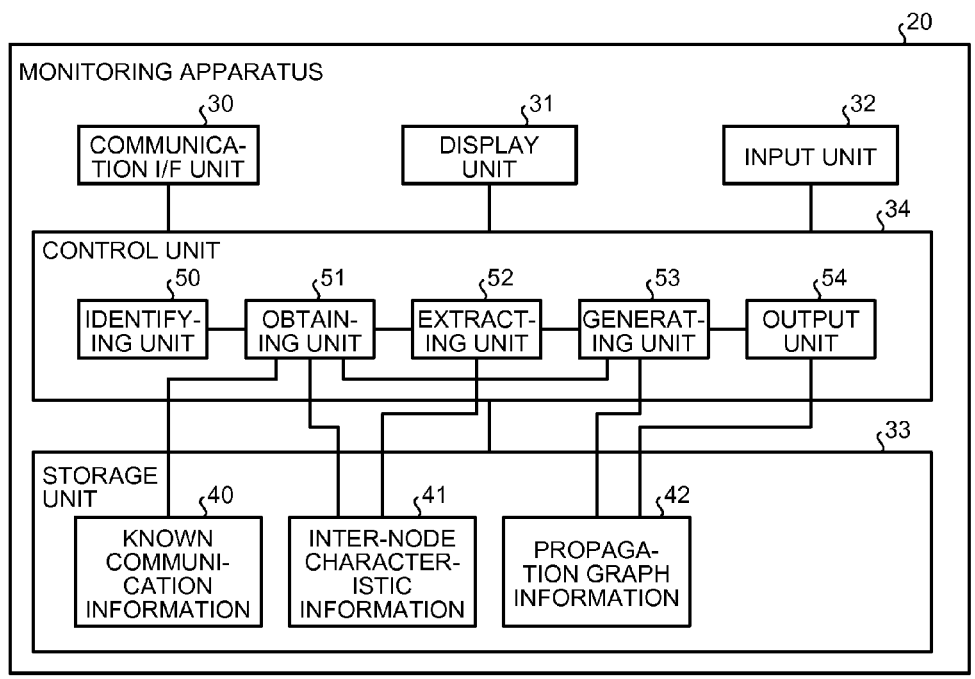
FIG. 2 is a diagram illustrating an example of a functional configuration of a monitoring apparatus according to a first embodiment.
FIG. 3 is a diagram illustrating an example of a data configuration of known communication information.

Next, a terminal according to the first embodiment will be described. FIG. 2 is a diagram illustrating an example of a functional configuration of the monitoring apparatus according to the first embodiment. As illustrated in FIG. 2, the monitoring apparatus 20 has a communication interface (I/F) unit 30, a display unit 31, an input unit 32, a storage unit 33, and a control unit 34.

The communication I/F unit 30 is an interface that controls communication. The communication I/F unit 30 transmits and receives various information to and from the other devices via the network 11. For example, the communication I/F unit 30 receives, via the network 11, data of a transmitted packet, from the switch 15. A network interface card, such as a LAN card, may be used as the communication I/F unit 30.

The display unit 31 is a display device that displays various information. Examples of the display unit 31 include display devices, such as a liquid crystal display (LCD) and a cathode ray tube (CRT). The display unit 31 displays various information. For example, the display unit 31 displays information indicating a propagation state of an unknown pattern, on a screen.

The input unit 32 is an input device that inputs various information. For example, examples of the input unit 32 include input devices, such as a mouse and a key board. The input unit 32 receives an input of an operation from a user, such as an administrator, and inputs operation information indicating content of the received operation to the control unit 34. For example, the input unit 32 receives an operation instructing a propagation state of an unknown pattern to be displayed.

The storage unit 33 is a storage device, such as: a semiconductor memory element like a flash memory; a hard disk; or an optical disk. The storage unit 33 may be a data-rewritable semiconductor memory, such as a random access memory or a flash memory.

The storage unit 33 stores therein an operating system (OS) and various programs executed by the control unit 34. Further, the storage unit 33 stores therein various data used in the programs executed by the control unit 34. For example, the storage unit 33 stores therein known communication information 40, inter-node characteristic information 41, and propagation graph information 42.

The known communication information 40 is data storing therein information related to the communication devices 12 among which communication is performed in the monitoring target system 10. For example, information related to transmission sources and transmission destinations among which communication is normally carried out in the monitoring target system 10 is stored in the known communication information 40.

FIG. 3 is a diagram illustrating an example of a data configuration of the known communication information. A table having therein items, such as "transmission source IP" and "transmission destination IP", which are associated with each other, may be used as the known communication information 40. The item, "transmission source IP", is an area storing therein the Internet protocol (IP) addresses of the transmission sources. The item, "transmission destination IP", is an area storing therein the IP addresses of the transmission destinations of the packets.

In a system, communication devices 12 among which communication is normally performed are fixed. For example, in a system where processing is distributed between a server and a client, communication occurs between the server and the client operated by the system. Accordingly, IP addresses of the communication devices 12 at a transmission source and a transmission destination between which communication is normally performed, are registered in the known communication information 40.

In the example of FIG. 3, as combinations of transmission sources and transmission destinations between which communication is performed, a transmission source IP "172.16.0.11" and a transmission destination IP "172.16.0.15", as well as a transmission source IP "172.16.0.22" and a transmission destination IP "172.16.0.11" are stored.

In this embodiment, combinations of transmission sources and transmission destinations between which communication is performed are registered in the known communication information 40 by an administrator or the like.

Returning to FIG. 2, the inter-node characteristic information 41 is data storing therein information related to a characteristic of communication between the communication devices 12 where the communication is performed. For example, in the inter-node characteristic information 41, for respective communication devices 12 between which communication is performed, information indicating a characteristic of the communication is stored.

FIG. 4 is a diagram illustrating an example of a data configuration of the inter-node characteristic information. A table having items, such as "transmission source IP", "transmission destination IP", and "communication characteristic series", which are associated with one another, may be used as the inter-node characteristic information 41. The item, "transmission source IP", is an area storing therein an IP address of the communication device 12 that is the transmission source of data. The item, "transmission destination IP", is an area storing therein an IP address of the communication device 12 that is the transmission destination of the data. The item, "communication characteristic series", is an area storing therein, along a time series, characteristics of the communication from the communication device 12 of the transmission source IP to the communication device 12 of the transmission destination IP. An example of the data of the inter-node characteristic information 41 will be described later.

Returning to FIG. 2, the propagation graph information 42 is data storing therein information related to a propagation path through which an unknown pattern has propagated. For example, in the propagation graph information 42, information indicating the propagated communication devices 12 is stored for each unknown pattern.

FIG. 5 is a diagram illustrating an example of a data configuration of the propagation graph information. A table having therein items, such as "graph ID", "unknown communication characteristic", "propagation graph", and "last update time", which are associated with one another, may be used as the propagation graph information 42. The item, "graph ID" is an area storing therein identification information that identifies a propagation of an unknown pattern. In this embodiment, to each communication characteristic of an unknown pattern, an identification (ID) number is given in sequence as the identification information. In the item, "graph ID", the given ID number is stored. The item, "unknown communication characteristic", is an area storing therein a communication characteristic of the unknown pattern. The item, "propagation graph", is an area storing therein information related to a propagation path through which the unknown pattern has propagated. In this embodiment, the propagation path is stored in a graph structure having, as nodes, the communication devices 12, through which the unknown pattern has propagated. The item, "last update time", is an area storing therein information indicating a time at which the propagation of the unknown pattern was last detected. An example of the data of the propagation graph information 42 will also be described later.

Returning to FIG. 2, the control unit 34 is a device that controls the monitoring apparatus 20. As the control unit 34, an electronic circuit, such as a central processing unit (CPU) or a micro processing unit (MPU), or an integrated circuit, such as an application specific integrated circuit (ASIC) or a field programmable gate array (FPGA), may be used. The control unit 34 has an internal memory for storing therein a program and control data, which prescribe various processing procedures, and executes various processes by these. The control unit 34 has various programs operated therein and functions as various processing units. For example, the control unit 34 has an identifying unit 50, an obtaining unit 51, an extracting unit 52, a generating unit 53, and an output unit 54.

The identifying unit 50 is a processing unit that performs various identifications. Data of a data portion of a packet transmitted from the switch 15 are input into the identifying unit 50. The data of this data portion are data of a packet transmitted and received between the communication devices 12, the packet being mirrored in the switch 15. That is, the data of the data portion are the data of the packet transmitted in the monitoring target system 10. For each predetermined time period, the identifying unit 50 identifies, from the input data of packets, for each group of the packets with the same transmission source and transmission destination, a communication characteristic. For example, the identifying unit 50 identifies, as a communication characteristic, any one or a plurality of: a frequency characteristic; a combination characteristic; and a series characteristic. The predetermined time period is determined correspondingly with a time period for malware, such as a worm, to perform communication in order to attempt infection to the other communication device 12. For example, if the malware takes three minutes to perform the communication in order to attempt the infection to the other communication device 12, the predetermined time period is determined to be three minutes. By causing the predetermined time period to correspond with the time period for attempting the infection, the communication characteristic upon the attempting of the infection is able to be identified. Further, the identifying unit 50 identifies a communication characteristic for each predetermined time period, which overlaps the above mentioned predetermined time period. For example, the identifying unit 50 starts identification of a communication characteristic for each predetermined time period, which is of a shorter cycle than the first mentioned predetermined time period. For example, the identifying unit 50 starts identification of communication characteristics for three minutes at one-minute cycles. By overlapping these predetermined time periods as described above, the communication characteristic due to the malware is able to be captured well in either of the time periods. By the identifying unit 50, a start of the first mentioned predetermined time period may match a start of the later mentioned predetermined time period.

The communication characteristic will now be described. For example, packets as illustrated in FIG. 6 are assumed to be input in sequence during a predetermined time period. FIG. 6 is a diagram illustrating an example of the packets. In the example of FIG. 6, from data of the packets, only items used in the description are illustrated, and thus "transmission source IP", "transmission destination IP", "transmission destination port", and "packet size" are illustrated. In the example of FIG. 6, four packets are illustrated in the input sequence from the top. In the example of FIG. 6, all of the transmission source IPs are "172.16.0.15", all of the transmission destination IPs are "172.16.0.12", and the transmission destination ports are "20", "80", "22", and "25".

Figure 7:
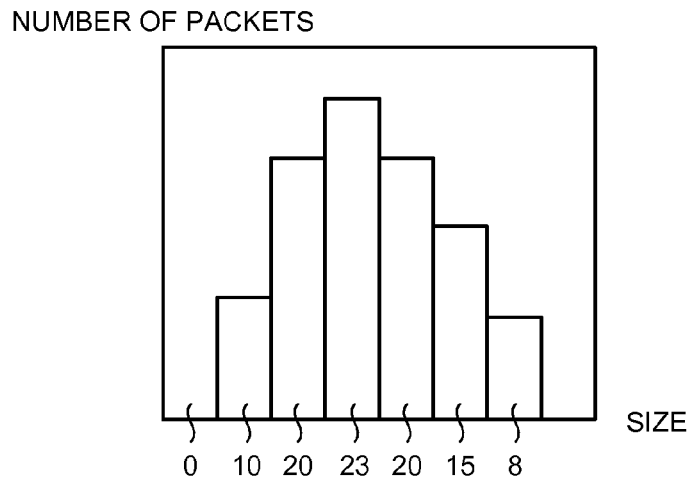
FIG. 7 is a diagram illustrating an example of a histogram of packet sizes of input packets.

For example, the identifying unit 50 finds a histogram of packet sizes of the input packets. That is, the identifying unit 50 counts the number of input packets for each predetermined size width. FIG. 7 is a diagram illustrating an example of the histogram of the packet sizes of the input packets. The horizontal axis of FIG. 7 represents the packet size. The vertical axis of FIG. 7 represents the number of packets. In the example of FIG. 7, a histogram with the numbers of packets being 10, 20, 23, 20, 15, and 8 in order from those of the small packet size is illustrated. The identifying unit 50 identifies the numbers of packets for respective packet sizes as a communication characteristic. For example, the identifying unit 50 identifies a vector having, as elements thereof, the numbers of packets for the respective packet sizes, as a communication characteristic. In the example of FIG. 7, as a communication characteristic, (0, 10, 20, 23, 20, 15, 8) is identified. This communication characteristic corresponds to the frequency characteristic.

Further, for example, the identifying unit 50 finds a list of transmission destination ports of the input packets and identifies the list of the transmission destination ports as a communication characteristic. For example, the identifying unit 50 arranges the transmission destination ports in ascending order of the port numbers, and identifies a vector having, as elements thereof, the respective port numbers, as a communication characteristic. For example, if the input packets are like those illustrated in FIG. 6, the identifying unit 50 identifies (22, 25, 80) as a communication characteristic. This communication characteristic corresponds to the combination characteristic.

Further, for example, the identifying unit 50 finds the number of packets for each of the transmission destination ports of the input packets, and identifies the numbers of packets for the respective transmission destination ports as a communication characteristic. For example, the identifying unit 50 finds the number of packets for each transmission destination port, and identifies, as a communication characteristic, a vector having respectively as elements thereof, the transmission destination ports and the numbers of packets of the transmission destination ports. For example, if the input packets are like those illustrated in FIG. 6, the identifying unit 50 identifies ((22, 2), (25, 1), (80, 1)) as a communication characteristic. For example, (22, 2) indicates that the number of packets of the port number "22" is "2". This communication characteristic corresponds to the frequency characteristic.

Further, for example, the identifying unit 50 lists the transmission destination ports of the input packets in the input order and identifies the list of the transmission destination ports as a communication characteristic. For example, if the input packets are like those illustrated in FIG. 6, the identifying unit 50 identifies (22, 80, 22, 25) as a communication characteristic. In this case, since the transmission destination ports are listed in the input order, the communication characteristic may include the same port number plurally. This communication characteristic corresponds to the series characteristic.

The communication characteristics are not limited to these, and may be anything representing characteristics of the communicated data. The communication characteristics are of various data formats, according to what they characterize. Hereinafter, when a communication characteristic is described independently of its data format, the communication characteristic will also be referred to as "characteristic X". Further, in this embodiment, an example, in which a communication characteristic is a histogram of packet sizes, will be described.

The identifying unit 50 outputs, to the obtaining unit 51, a communication characteristic identified for each group of packets with the same transmission source and transmission destination. For example, the identifying unit 50 outputs the identified communication characteristic, together with information indicating the transmission source, the transmission destination, and the current time, to the obtaining unit 51.

The obtaining unit 51 is a processing unit that performs various obtainments. For each predetermined time period, the obtaining unit 51 obtains, from packets transmitted in the monitoring target system 10, a packet set with a combination of a transmission source and a transmission destination, the combination being different from a predetermined combination of a transmission source and a transmission destination. For example, the obtaining unit 51 identifies, from communication characteristics that have been identified and input from the identifying unit 50, a communication characteristic of a transmission source and a transmission destination of a combination of a transmission source and a transmission destination not stored in the known communication information 40.

Propagation of an unknown pattern will now be described. For example, malware, such as a worm, is spread in a network by duplicating itself and transmitting the duplicated data to the other communication devices 12. Thus, communication between the communication devices 12 where communication is not performed normally may be communication due to the malware. Therefore, in this embodiment, transmission sources and transmission destinations known as having communication performed therebetween are stored in the known communication information 40. The obtaining unit 51 regards communication between a transmission source and a transmission destination not stored in the known communication information 40, from among packets transmitted in the monitoring target system 10, as communication due to an unknown pattern, such as malware to obtain a communication characteristic of the unknown pattern.

The obtaining unit 51 outputs, as a communication characteristic of an unknown pattern, the identified communication characteristic to the extracting unit 52. For example, the obtaining unit 51 outputs the identified communication characteristic, together with the information indicating the transmission source, the transmission destination, and the time of the input data, to the extracting unit 52. Further, the obtaining unit 51 registers, in the inter-node characteristic information 41, the transmission sources and transmission destinations of the combinations of the transmission sources and the transmission destinations stored in the known communication information 40, as well as their communication characteristics. Further, the obtaining unit 51 outputs, to the generating unit 53, the communication characteristic for the combination of the transmission source and the transmission destination stored in the known communication information 40, the transmission source, and the transmission destination.

Figure 8:
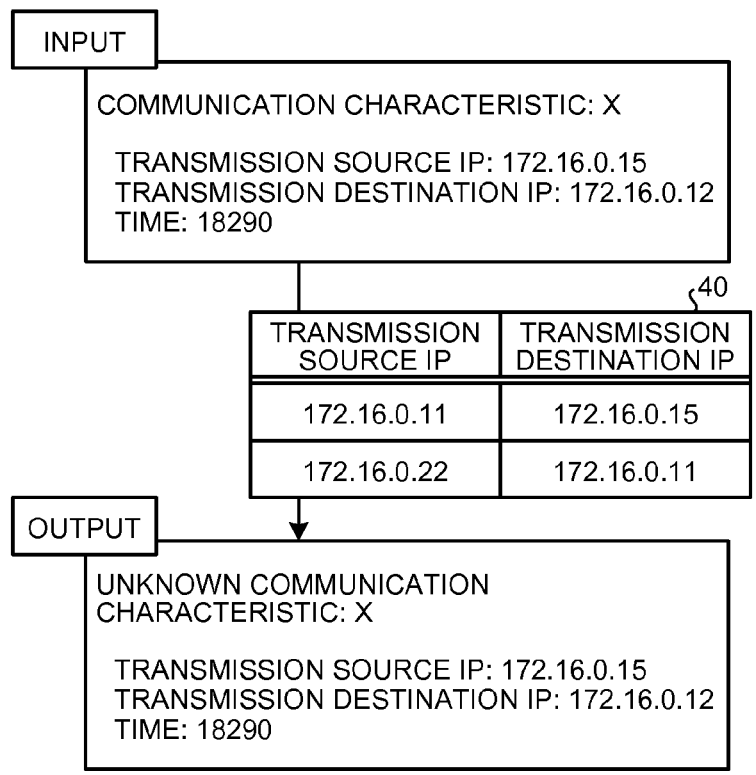
FIG. 8 is a diagram schematically illustrating a process for a case where a combination of a transmission source and a transmission destination is not stored in the known communication information.

An example will now be described. FIG. 8 is a diagram schematically illustrating a process for a case where a combination of a transmission source and a transmission destination is not stored in the known communication information. As illustrated in FIG. 8, in the known communication information 40, a transmission source IP "172.16.0.11" and a transmission destination IP "172.16.0.15", as well as a transmission source IP "172.16.0.22" and a transmission destination IP "172.16.0.11" are stored. Further, in the example of FIG. 8, data including a characteristic "X", a transmission source IP "172.16.0.15", a transmission destination IP "172.16.0.12", and a time "18290" are input. In this case, the obtaining unit 51 determines whether the combination of the transmission source IP "172.16.0.15" and transmission destination IP "172.16.0.12" is stored in the known communication information 40. In this case, since the combination is not stored in the known communication information 40, the obtaining unit 51 outputs the input data to the extracting unit 52.

Figure 9:
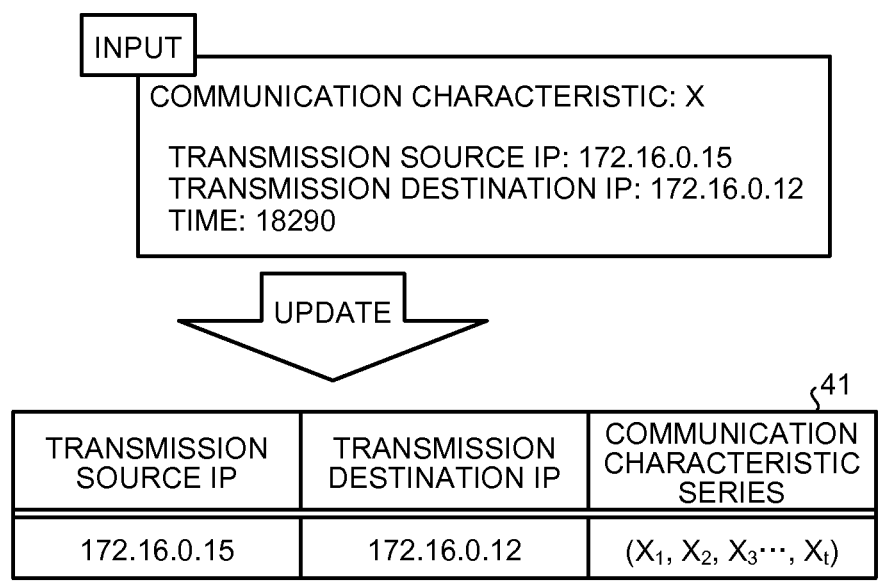
FIG. 9 is a diagram schematically illustrating a process for a case where a combination of a transmission source and a transmission destination is stored in the known communication information.

On the contrary, FIG. 9 is a diagram schematically illustrating a process for a case where a combination of a transmission source and a transmission destination is stored in the known communication information. For example, if the transmission source IP "172.16.0.15" and transmission destination IP "172.16.0.12" are stored in the known communication information 40, the obtaining unit 51 registers the communication characteristic of the transmission source and transmission destination in the inter-node characteristic information 41. In the example of FIG. 9, correspondingly with the transmission source IP "172.16.0.15" and transmission destination IP "172.16.0.12", the characteristic X is stored in the item, "communication characteristic series". In this embodiment, characteristics X with the same transmission source IP and transmission destination IP are stored along a time series in the item, "communication characteristic series". The characteristics $X_0$ to $X_t$ represent the characteristics X at the respective times. The times may be stored with the respective characteristics X. Further, in the item, "communication characteristic series", the characteristics X for the respective predetermined time periods may be stored in sequence. For example, if a characteristic has been identified, the obtaining unit 51 may store the identified characteristic X, and for a time at which a characteristic has not been identified, the obtaining unit 51 may store data (for example, "zero") indicating that a characteristic is unidentified.

Returning to FIG. 2, the extracting unit 52 is a processing unit that performs various extractions. The extracting unit 52 extracts a related packet related to the packet obtained by the obtaining unit 51. For example, the extracting unit 52 extracts a related packet, which includes the characteristic of the data input from the obtaining unit 51 and has a destination (transmission destination) that is the transmission source of the packet for which the characteristic has been identified. For example, the extracting unit 52 reads, from the inter-node characteristic information 41, the item, "communication characteristic series", of a record having an IP address in the item, "transmission destination IP", the IP address matching the transmission source IP address included in the data input from the obtaining unit 51. The extracting unit 52 then compares the characteristic X included in the data input from the obtaining unit 51 with the characteristics $X_0$ to $X_t$ stored in the item, "communication characteristic series", one by one retroactively from $X_t$. As a result of the comparison, if the characteristic X is included in any of the characteristics $X_0$ to $X_t$, the extracting unit 52 determines that propagation of the unknown pattern to the communication device 12 at the transmission destination IP from the communication device 12 at the transmission source IP of the read record has occurred. Further, the item, "communication characteristic series", of a record having an IP address in the item, "transmission destination IP", the IP address matching the transmission source IP address included in the data input from the obtaining unit 51, is read out from the inter-node characteristic information 41 to continue the same search.

Normal communication occurs even if a communication device 12 is infected with malware. Thus, a communication characteristic in a communication device 12 infected with malware includes a communication characteristic due to the malware. If the communication characteristic due to the malware is included in the communication characteristic, there is a risk that the communication device 12 at the transmission source is infected with the malware.

For example, it is assumed that the characteristic X is the histogram of the packet sizes and is represented by the following characteristic X. Further, it is assumed that the characteristics to be compared therewith are the following target A and target B.
Characteristic X: (10, 20, 23, 20, 15, 8)
Target A: (14, 22, 25, 22, 18, 9)
Target B: (9, 22, 20, 22, 12, 9)

All of the values of the target A are larger than those of the characteristic X. That is, in the target A, the communication of the characteristic X is included. If the communication of the characteristic X is included like this, the malware may have been propagated. On the contrary, some of the values of the target B are larger than those of the characteristic X. That is, in the target B, the communication of the characteristic X is not included. If the communication of the characteristic X is not included like this, malware is considered to have not been propagated.

Further, for example, it is assumed that the characteristic X is the list of the transmission destination ports of the packets and is represented by the following characteristic X. Further, it is assumed that the characteristics to be compared therewith are the following target A and target B.
Characteristic X: (20, 25, 80)
Target A: (20, 22, 25, 80, 8080)
Target B: (22, 25, 80, 8080)

The target A includes all of the transmission destination ports of the characteristic X. That is, in the target A, the communication of the characteristic X is included. If the communication of the characteristic X is included like this, malware may have been propagated. On the contrary, in the target B, the transmission destination port "20" is not included. That is, in the target B, the communication of the characteristic X is not included. If the communication of the characteristic X is not included like this, malware is considered to have not been propagated.

Further, for example, it is assumed that the characteristic X is the numbers of packets for the respective transmission destination ports, and is represented by the following characteristic X. Further, it is assumed that the characteristics to be compared therewith are the following target A and target B.
Characteristic X: ((22, 2), (25, 1), (80, 1))
Target A: ((20, 1), (22, 3), (25, 5), (80, 2))
Target B: ((20, 1), (22, 1), (25, 2))

The target A includes all of the transmission destination ports of the characteristic X and the numbers of the packets are larger than those of the characteristic X at all of the transmission destination ports. That is, in the target A, the communication of the characteristic X is included. If the communication of the characteristic X is included like this, malware may have been propagated. On the contrary, in the target B, the transmission destination port "80" is not included and the number of packets at the transmission destination port "22" is less than that of the characteristic X. That is, in the target B, the communication of the characteristic X is not included. If the communication of the characteristic X is not included like this, malware is considered to have not been propagated.

Further, for example, it is assumed that the characteristic X is the list of the transmission destination ports arranged in the input order and is represented by the following characteristic X. Further, it is assumed that the characteristics to be compared therewith are the following target A and target B.
Characteristic X: (22, 80, 22, 25)
Target A: (14, 22, 25, 80, 22, 18, 25)
Target B: (9, 22, 22, 25, 12, 80)

In the target A, the transmission destination ports of the characteristic X are included with the order thereof not being changed. That is, in the target A, the communication of the characteristic X is included. If the communication of the characteristic X is included like this, malware may have been propagated. On the contrary, in the target B, all of the transmission destination ports of the characteristic X are included, but the order of the transmission destination ports "22", "80", and "25" is different. That is, in the target B, the communication of the characteristic X is not included. If the communication of the characteristic X is not included like this, malware is considered to have not been propagated.

If propagation of the unknown pattern has occurred, the extracting unit 52 performs further searching retroactively for an interval in which the communication where the propagation has occurred was performed. For example, if propagation of the known pattern has occurred, the extracting unit 52 extracts a related packet including the characteristic of the input data and destined for the transmission source where the propagation has occurred.

The extracting unit 52 outputs, to the generating unit 53, the transmission source IP and transmission destination IP where the propagation has occurred. For example, The extracting unit 52 outputs, to the generating unit 53, information indicating the identified communication characteristic, the transmission source and transmission destination of the characteristic, the time, and the transmission source IP and transmission destination IP where the propagation has occurred.

Figure 10:
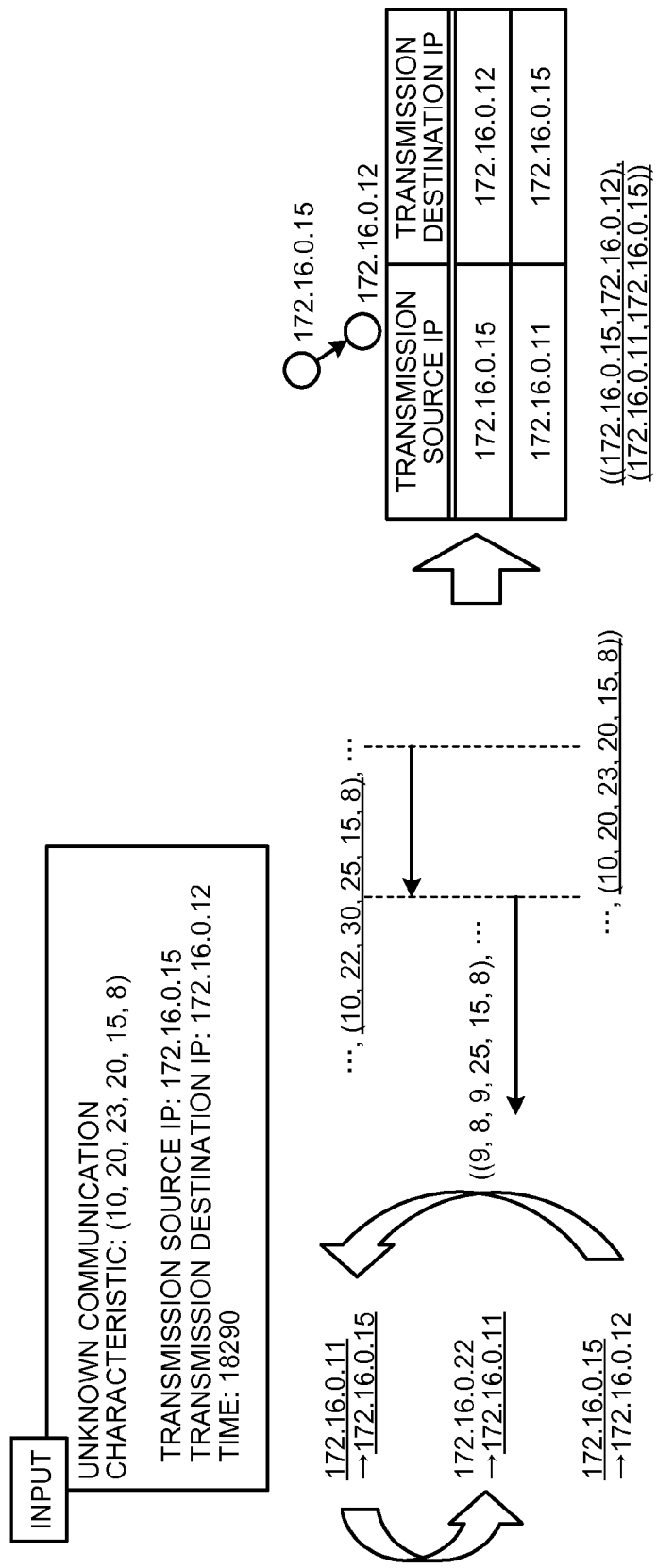
FIG. 10 is a diagram schematically illustrating a process of searching for propagation.

An example will now be described. FIG. 10 is a diagram schematically illustrating a process of searching for propagation. In the example of FIG. 10, data including the communication characteristic X "(10, 20, 23, 20, 15, 8)", the transmission source IP "172.16.0.15", the transmission destination IP "172.16.0.12", and the time "18290" are input. The extracting unit 52 determines whether the characteristic X is included in the characteristic "(10, 22, 30, 25, 15, 8)" of the communication between "172.16.0.11" and "172.16.0.15" having the transmission source IP "172.16.0.15" as the transmission destination. In the example of FIG. 10, that characteristic X is included. In this case, the extracting unit 52 determines whether the characteristic X is included in the characteristic (9, 8, 9, 25, 15, 8) of the communication between "172.16.0.22" and "172.16.0.11", having the transmission source IP "172.16.0.11" as the transmission destination. In the example of FIG. 10, the characteristic X is not included. In that case, the extracting unit 52 outputs, to the generating unit 53, "172.16.0.15" and "172.16.0.12", as well as "172.16.0.11" and "172.16.0.15" as the transmission source IPs and transmission destination IPs where the propagation has occurred. Accordingly, how the unknown pattern has propagated is able to be grasped. The example of FIG. 10 illustrates that the unknown pattern has propagated from "172.16.0.11" to "172.16.0.15".

Figure 11:
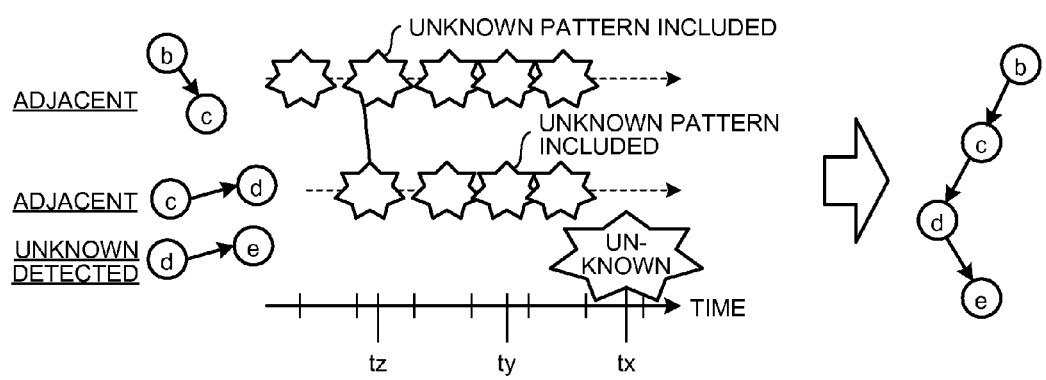
FIG. 11 is a diagram illustrating in detail an example of a flow of the search for propagation.

FIG. 11 is a diagram illustrating in more detail an example of a flow of the search for propagation. For example, it is assumed that between a d-node and an e-node, communication is normally not performed, and an unknown pattern of a characteristic X is identified at a time $t_x$. In that case, the extracting unit 52 compares each characteristic of the communication between the d-node, which is the transmission source, and a c-node at a transmission source, which performs communication having the d-node as a transmission destination, with the characteristic X retroactively from the time $t_x$. If the characteristic X is included in any of the characteristics of the communication between the d-node and c-node, the extracting unit 52 then determines that propagation of the unknown pattern has occurred between the d-node and c-node also. In the example of FIG. 11, the characteristic X is included in the characteristic at time $t_y$. The extracting unit 52 compares each characteristic of the communication between the c-node and a b-node at a transmission source, which performs communication having the c-node as a transmission destination, with the characteristic X retroactively from the time $t_y$. If the characteristic X is included in any of the characteristics of the communication between the c-node and b-node, the extracting unit 52 then determines that propagation of the unknown pattern has occurred between the c-node and b-node also. In the example of FIG. 11, the characteristic X is included in the characteristic at time $t_z$. The extracting unit 52 finds the transmission source IP addresses and transmission destination IP addresses for the d-node and e-node, the c-node and d-node, the b-node and c-node, respectively, and outputs them to the generating unit 53. The example of FIG. 11 illustrates that the unknown pattern has propagated from the b-node to the c-node, the c-node to the d-node, and the d-node to the e-node.

The generating unit 53 is a processing unit that generates various pieces of information. The generating unit 53 generates information indicating a degree of propagation. For example, the generating unit 53 stores, as the information indicating the degree of propagation, the transmission source IP addresses and transmission destination IP addresses in the interval where the propagation has occurred, in the propagation graph information 42.

Figure 12:
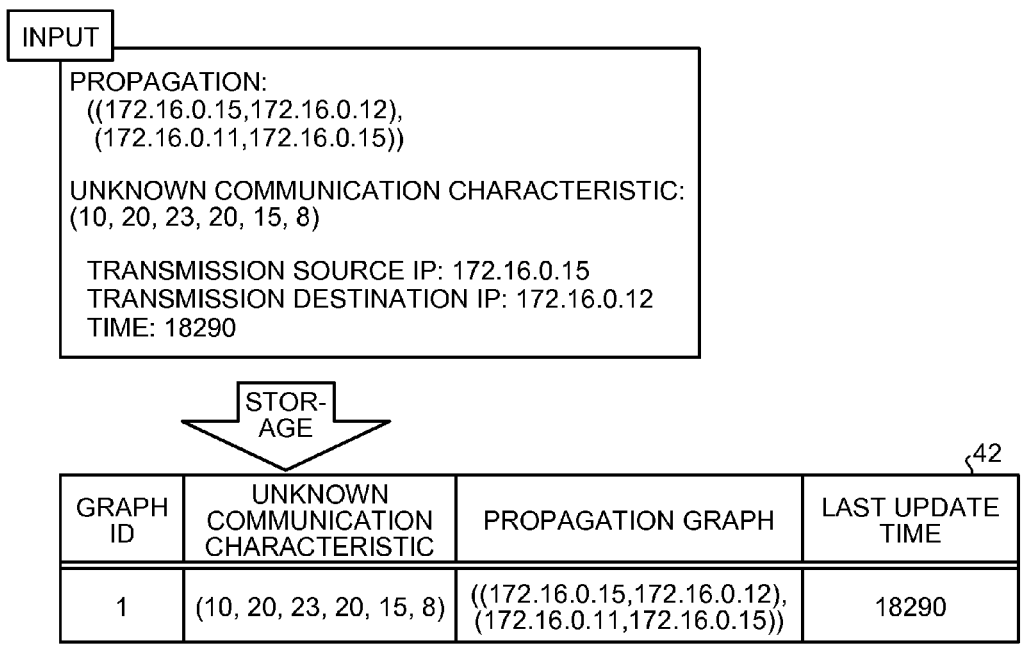
FIG. 12 is a diagram schematically illustrating a process of generating information indicating a degree of propagation.

An example will now be described. FIG. 12 is a diagram schematically illustrating a process of generating the information indicating the degree of propagation. In the example of FIG. 12, it is assumed that as propagation, the data, "172.16.0.15" and "172.16.0.12", as well as "172.16.0.11" and "172.16.0.15", have been input. In the example of FIG. 12, it is assumed that the data, the communication characteristic X "(10, 20, 23, 20, 15, 8)", the transmission source IP "172.16.0.15", the transmission destination IP "172.16.0.12", and the time "18290" have been input. If the characteristic X is new and have not been stored in the past, the generating unit 53 gives a new graph ID thereto, and stores the characteristic X, the propagation graph, and the time in the items, "graph ID", "unknown communication characteristic", "propagation graph", and "last update time" of the propagation graph information 42, respectively.

Further, if the transmission source, transmission destination, and communication characteristic that have been stored in the known communication information 40 are input from the obtaining unit 51, the generating unit 53 determines whether the input characteristic includes any of the characteristics stored in the item, "unknown communication characteristic" of the propagation graph information 42. If the input characteristic includes any of the characteristic in the item, "unknown communication characteristic", the generating unit 53 determines whether the time is within a predetermined propagation monitoring time K from the time stored in the item, "last update time". The propagation monitoring time K is a time period over which a characteristic is held for detecting an unknown pattern. The propagation monitoring time K is determined according to a cycle for malware to attempt infection to another communication device 12. For example, if the cycle for malware to attempt infection to another communication device 12 is three months, the propagation monitoring time K is of a value corresponding to three months. If the time stored in the item, "last update time", is within the propagation monitoring time K, the generating unit 53 adds the input transmission source and transmission destination in the item, "propagation graph", of a record having a characteristic in the item, "unknown communication characteristic", the characteristic including the input characteristic.

Figure 13:
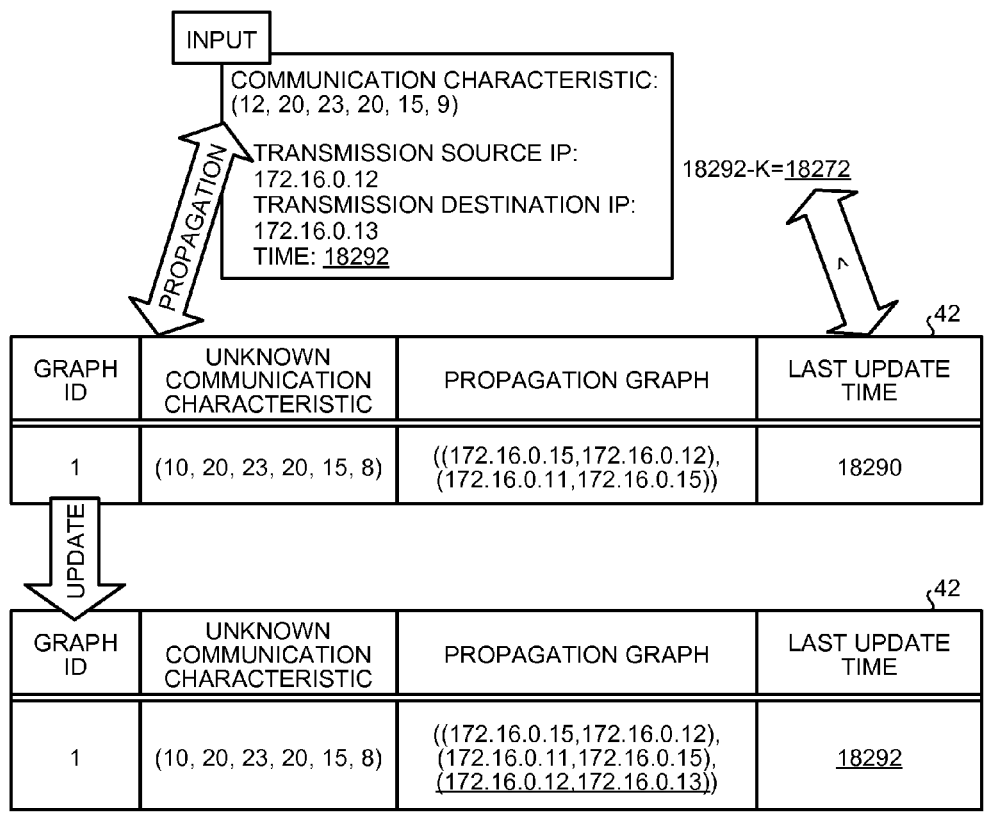
FIG. 13 is a diagram schematically illustrating the process of generating information indicating a degree of propagation.

An example will now be described. FIG. 13 is a diagram schematically illustrating a process of generating the information indicating the degree of propagation. In the example of FIG. 13, it is assumed that data including the communication characteristic X "(12, 20, 23, 20, 15, 9)", the transmission source IP "172.16.0.12", the transmission destination IP "172.16.0.13", and the time "18292" have been input. Further, in order to make the description easier to understand, the propagation monitoring time K is assumed to be "20". In the example of FIG. 13, the characteristic X includes (10, 20, 23, 20, 15, 8) that has been stored in the item, "unknown communication characteristic", of the propagation graph information 42, and the time is within the propagation monitoring time K. Thus, the generating unit 53 adds, in the item, "propagation graph", the transmission source IP "172.16.0.12" and transmission destination IP "172.16.0.13". Further, the generating unit 53 updates the time in the item, "last update time".

The generating unit 53 deletes, from the propagation graph information 42, a record having a time stored in the item, "last update time", the time being before the propagation monitoring time K. Thereby, a record of propagation low in frequency of communication and estimated to be not due to malware or the like is deleted. Further, the generating unit 53 deletes the characteristic with the time that is before the propagation monitoring time K, from the characteristics stored in the item, "communication characteristic series", of the inter-node characteristic information 41. Thereby, in the item, "communication characteristic series", only the characteristics within the propagation monitoring time K are stored.

Figure 14:
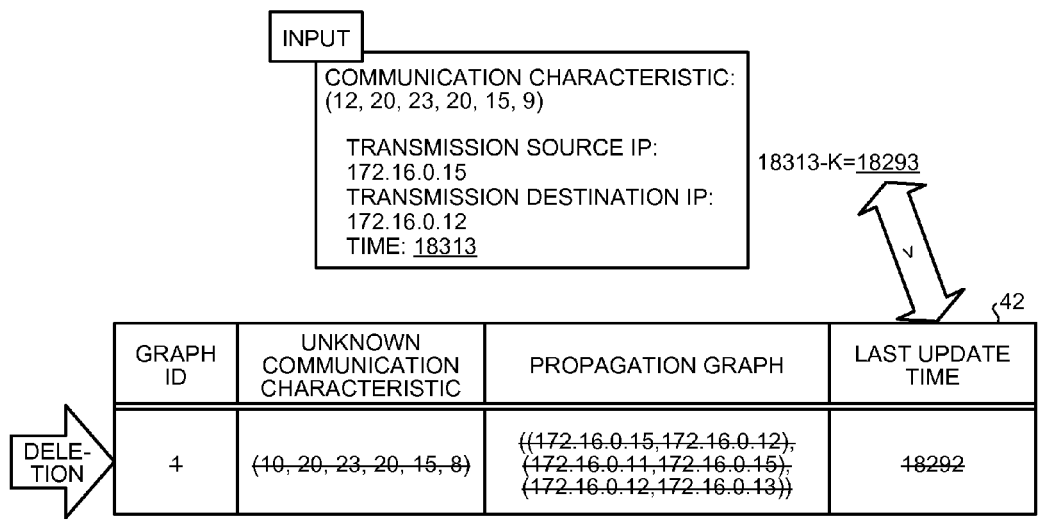
FIG. 14 is a diagram schematically illustrating a process of deleting data of the propagation graph information.

FIG. 14 is a diagram schematically illustrating a process of deleting data of the propagation graph information. In the example of FIG. 14, the time stored in the item, "last update time", is before the propagation monitoring time K. Therefore, the generating unit 53 deletes, from the propagation graph information 42, the record having the time that is before the propagation monitoring time K. Thereby, an unknown pattern that has gone through the propagation monitoring time K is deleted.

The output unit 54 is a processing unit that outputs various pieces of information. The output unit 54 outputs, based on the information stored in the propagation graph information 42, information indicating a propagation state of an unknown pattern. For example, if an operation instructing a propagation state of an unknown pattern to be displayed is received by the input unit 32, the output unit 54 counts, for each record of the propagation graph information 42, from the information indicating the propagation path stored in the item, "propagation graph", the number of nodes where the unknown pattern is input and output. That is, the output unit 54 counts the number of IP addresses that are both a transmission destination and a transmission source in the propagation path.

Figure 15:
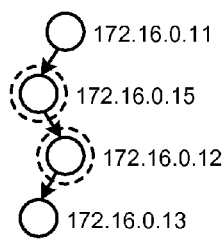
FIG. 15 is a diagram schematically illustrating a process of counting the number of nodes.

FIG. 15 is a diagram schematically illustrating a process of counting the number of nodes. In the example of FIG. 15, propagation of an unknown pattern occurs in the order of "172.16.0.11", "172.16.0.15", "172.16.0.12", and "172.16.0.13". In this case, the nodes where the unknown pattern is both input and output are "172.16.0.15" and "172.16.0.12", and thus the number of nodes is counted as two. There is a risk that these nodes where the unknown pattern is input and output are infected with malware because they transmit the received unknown pattern. On the contrary, for example, a node to which an unknown pattern is input but from which the unknown pattern is not output has received an attack by malware but may have not been infected with the malware. In this embodiment, in order to grasp a propagation state of infection with malware, nodes where an unknown pattern is input and output are counted.

Figure 16:
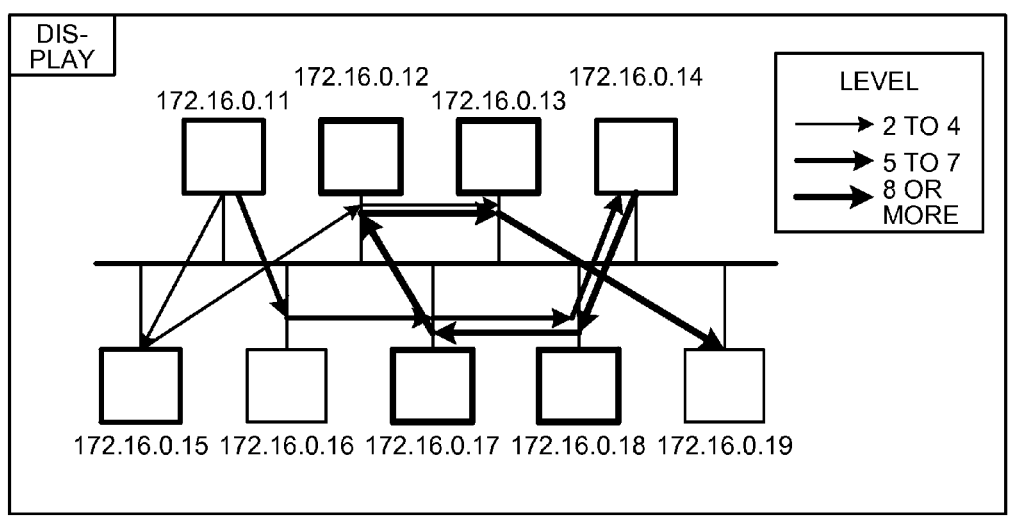
FIG. 16 is a diagram illustrating an example of a screen indicating a propagation state.

The output unit 54 outputs a screen indicating a propagation state of an unknown pattern. For example, the output unit 54 displays a screen indicating a propagation state in different levels according to the number of nodes where an unknown pattern is input and output. FIG. 16 is a diagram illustrating an example of a screen indicating a propagation state. In the example of FIG. 16, an IP address of each communication device 12 is displayed, and propagation paths are illustrated by joining nodes where propagation of unknown patterns has occurred, with arrows. Further, in the example of FIG. 16, the greater the number of nodes where an unknown pattern is input and output is, the more emphasized the arrows are by being made thicker to illustrate the level to be higher. As a result, an administrator is able to grasp a state of propagation of an unknown pattern.

Figure 17:
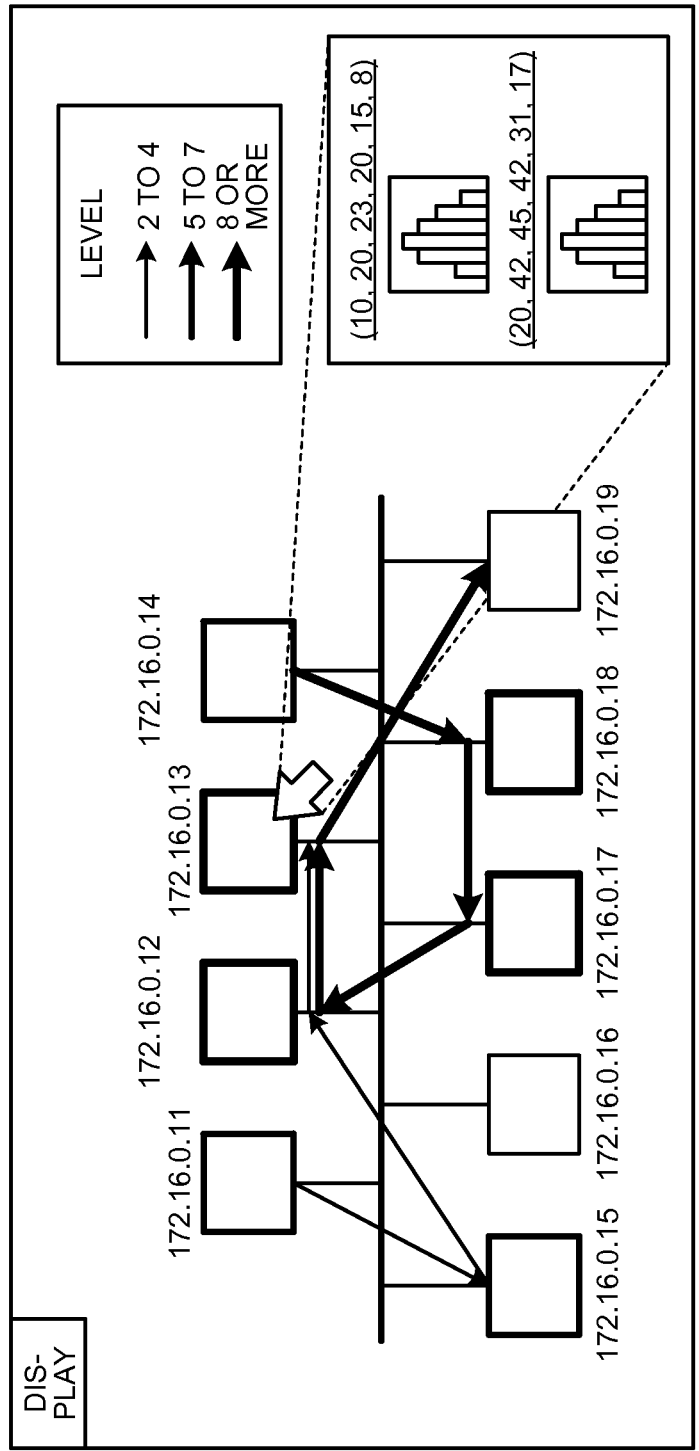
FIG. 17 is a diagram illustrating an example of the screen indicating a propagation state.

Further, the output unit 54 outputs a screen indicating a propagation state for a particular node. For example, in FIG. 16, if a node is specified, the output unit 54 outputs a screen indicating a propagation state for the specified node. FIG. 17 is a diagram illustrating an example of a screen indicating a propagation state. In the example of FIG. 17, a state where "172.16.0.13" has been specified is illustrated. In the example of FIG. 16, a propagation path of an unknown pattern that propagates through the node "172.16.0.13" is displayed. In the example of FIG. 17, communication characteristics of unknown patterns that propagate to the node "172.16.0.13" are displayed.

Figure 18:
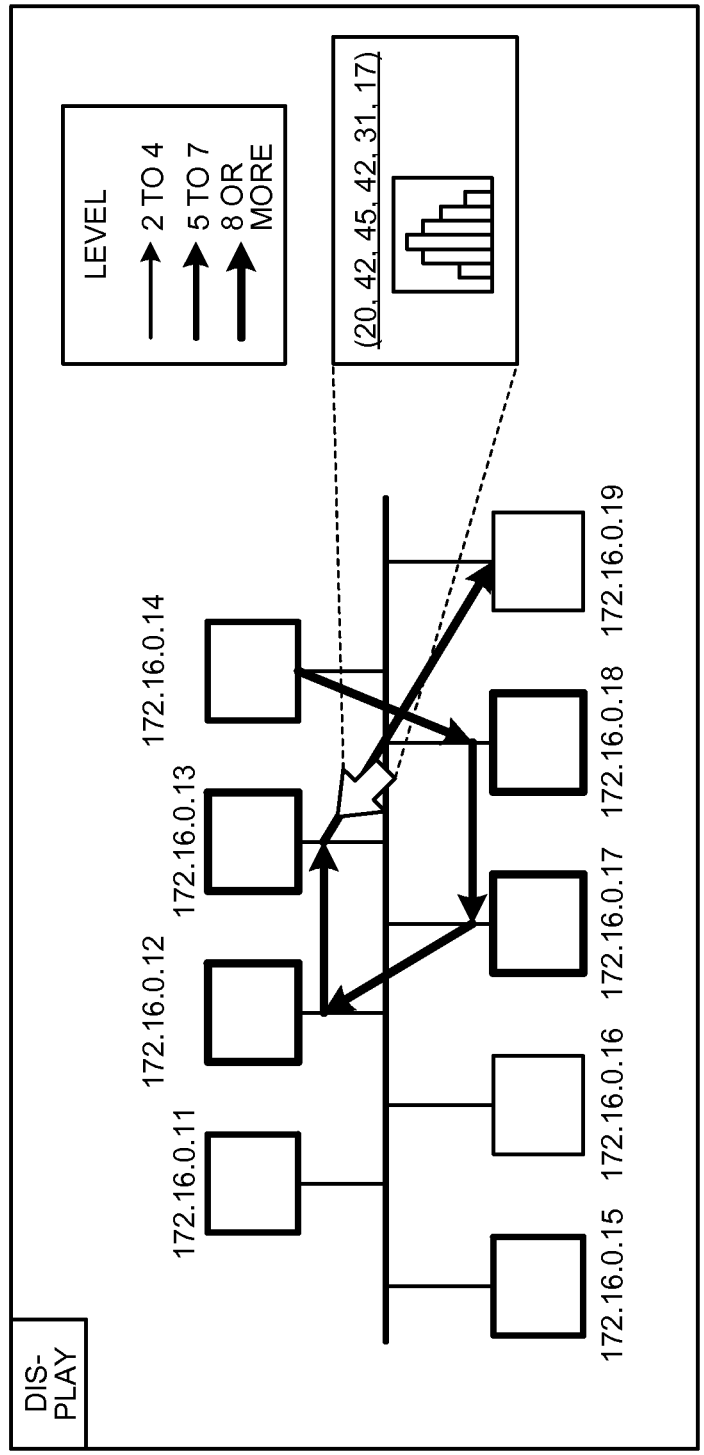
FIG. 18 is a diagram illustrating an example of the screen indicating a propagation state.

Further, the output unit 54 outputs a screen indicating a propagation state for a particular path. For example, in FIG. 17, if a path is specified, the output unit 54 outputs a screen indicating a propagation state for the specified path. FIG. 18 is a diagram illustrating an example of a screen indicating a propagation state. In the example of FIG. 18, a state where a path from "172.16.0.13" to "172.16.0.19" has been specified is illustrated. In the example of FIG. 18, a communication characteristic of an unknown pattern in the path propagating from "172.16.0.13" to "172.16.0.19" is displayed.

Flow of Process

Figure 19:
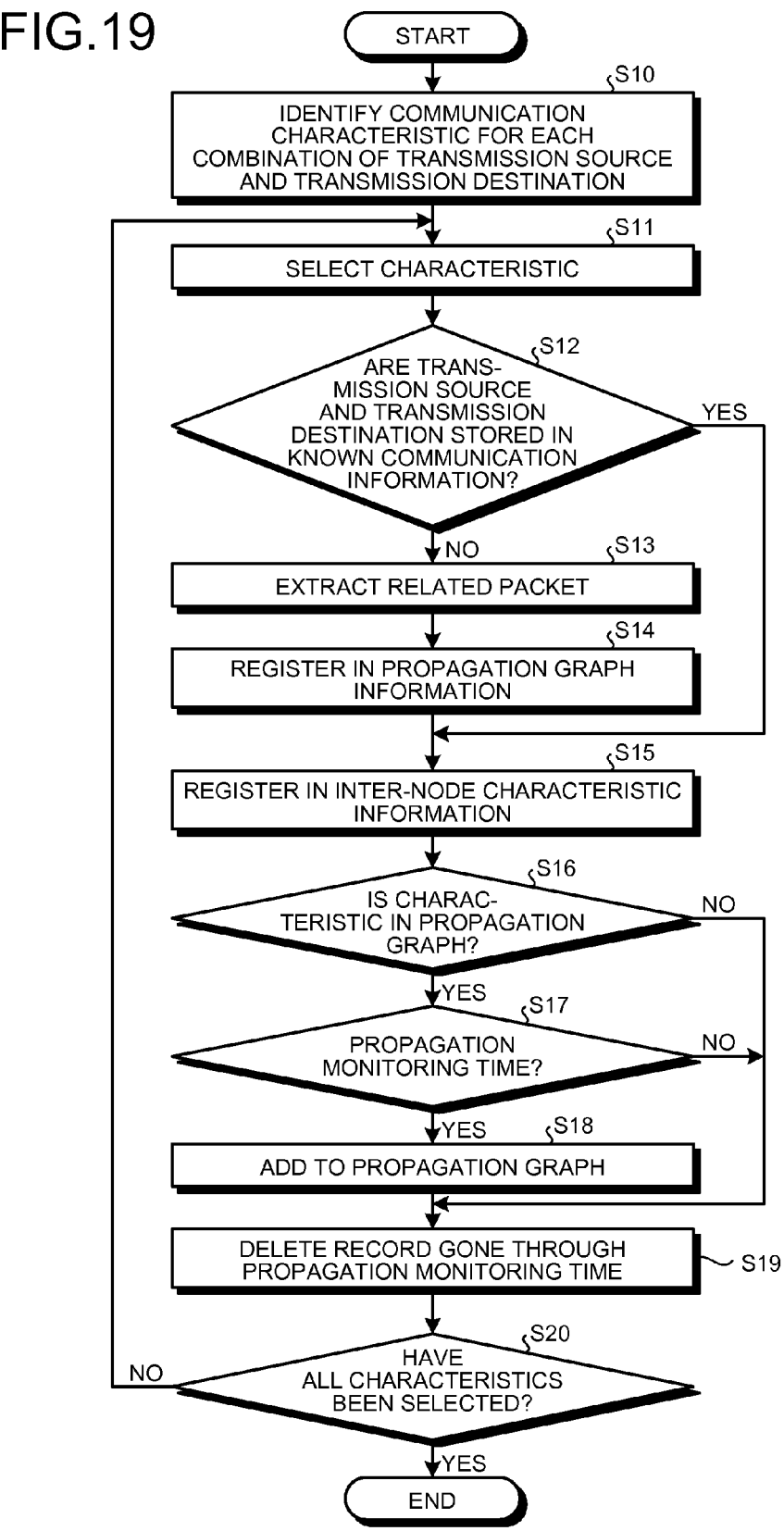
FIG. 19 is a flow chart illustrating an example of a procedure of a monitoring process.

Next, a flow of a monitoring process of monitoring a propagation state of an unknown pattern by the monitoring apparatus 20 according to this embodiment will be described. FIG. 19 is a flow chart illustrating an example of a procedure of the monitoring process. This monitoring process is executed at a predetermined timing, for example for each predetermined time period.

As illustrated in FIG. 19, the identifying unit 50 identifies, for each predetermined time period, a communication characteristic for a group of packets having the same transmission source and transmission destination, from data of input packets (Step S10). The obtaining unit 51 selects one of the identified characteristics, the one not having been selected before (Step S11). The obtaining unit 51 determines whether or not the combination of the transmission source and transmission destination of the selected communication characteristic has been stored in the known communication information 40 (Step S12). If not stored in the known communication information 40 (Step S12: No), the extracting unit 52 regards the communication characteristic as the communication characteristic of an unknown pattern and extracts a related packet (Step S13). For example, the extracting unit 52 reads out, from the inter-node characteristic information 41, the item, "communication characteristic series", of a record having an IP address in the item, "transmission destination IP", the IP address matching the transmission source IP address of the unknown pattern. The extracting unit 52 then compares the characteristic of the unknown pattern with the characteristics stored in the item, "communication characteristic series", in the order reverse of the time, and searches for communication where propagation of the unknown pattern has occurred, the communication including the characteristic of the unknown pattern. The generating unit 53 stores the transmission source IP addresses and transmission destination IP addresses of the interval over which the propagation has occurred in the propagation graph information 42 (Step S14).

If stored in the known communication information (Step S12: Yes), or after storage into the propagation graph information 42 (Step S14) if not stored in the known communication information 40 (Step S12: No), the obtaining unit 51 registers the transmission source, transmission destination, and communication characteristic in the inter-node characteristic information 41 (Step S15). The generating unit 53 determines whether the communication characteristic includes any of the characteristics stored in the item, "unknown communication characteristic", of the propagation graph information 42 (Step S16). If the characteristic is included (Step S16: Yes), the generating unit 53 determines whether it is within the predetermined propagation monitoring time K from the time stored in the item, "last update time", of the record including the characteristic (Step S17). If the characteristic is not included (Step S16: No), or if not within the propagation monitoring time K (Step S17: No), the process proceeds to later described Step S19.

On the contrary, if it is within the propagation monitoring time K (Step S17: Yes), the generating unit 53 adds the transmission source and transmission destination into the item, "propagation graph", of the record including the characteristic (Step S18). The generating unit 53 deletes, from the propagation graph information 42, a record having a time stored in the item, "last update time", the time being before the propagation monitoring time K (Step S19).

The obtaining unit 51 determines whether or not all of the identified characteristics have been selected (Step S20). If all have not been selected (Step S20: No), the process proceeds to above described Step S11. On the contrary, if all have been selected (Step S20: Yes), the process is ended.

Effects

As described above, the monitoring apparatus 20 according to this embodiment obtains, for each predetermined time period, from the packets transmitted in the monitoring target system 10, the packet set with the combination of the transmission source and the transmission destination, the combination being different from the predetermined combination of the transmission source and the transmission destination. The monitoring apparatus 20 extracts, for each predetermined time period, from the packets transmitted in the monitoring target system 10, the related packet related to the obtained packet. The monitoring apparatus 20 generates, based on the extracted related packet, the information indicating the degree of propagation. The monitoring apparatus 20 outputs the generated information. As a result, the monitoring apparatus 20 is able to grasp a propagation state of an unknown pattern.

Further, the monitoring apparatus 20 according to this embodiment identifies, from the packets transmitted in the monitoring target system 10, the communication characteristic of each group of packets having the same transmission source and transmission destination, for each predetermined time period. The monitoring apparatus 20 extracts the related packet including the characteristic identified from the obtained packet, the related packet being destined for the transmission source of the packet for which the characteristic has been identified. As a result, the monitoring apparatus 20 is able to extract a propagation path through which an unknown pattern caused by malware or the like has propagated.

Further, the monitoring apparatus 20 according to this embodiment identifies, as the communication characteristic, any one or a plurality of the frequency characteristic, the combination characteristic, and the series characteristic. As a result, the monitoring apparatus 20 is able to identify a characteristic of an unknown pattern caused by malware or the like.

Further, the monitoring apparatus 20 according to this embodiment obtains the packet set with the combination of the transmission source and transmission destination not stored in the storage unit 33 storing therein the predetermined combinations of transmission sources and transmission destinations where the communication is performed in the system. As a result, the monitoring apparatus 20 is able to obtain a packet communicated by malware or the like.

[b] Second Embodiment

Next, a second embodiment will be described.

Configuration of Monitoring Apparatus

Figure 20:
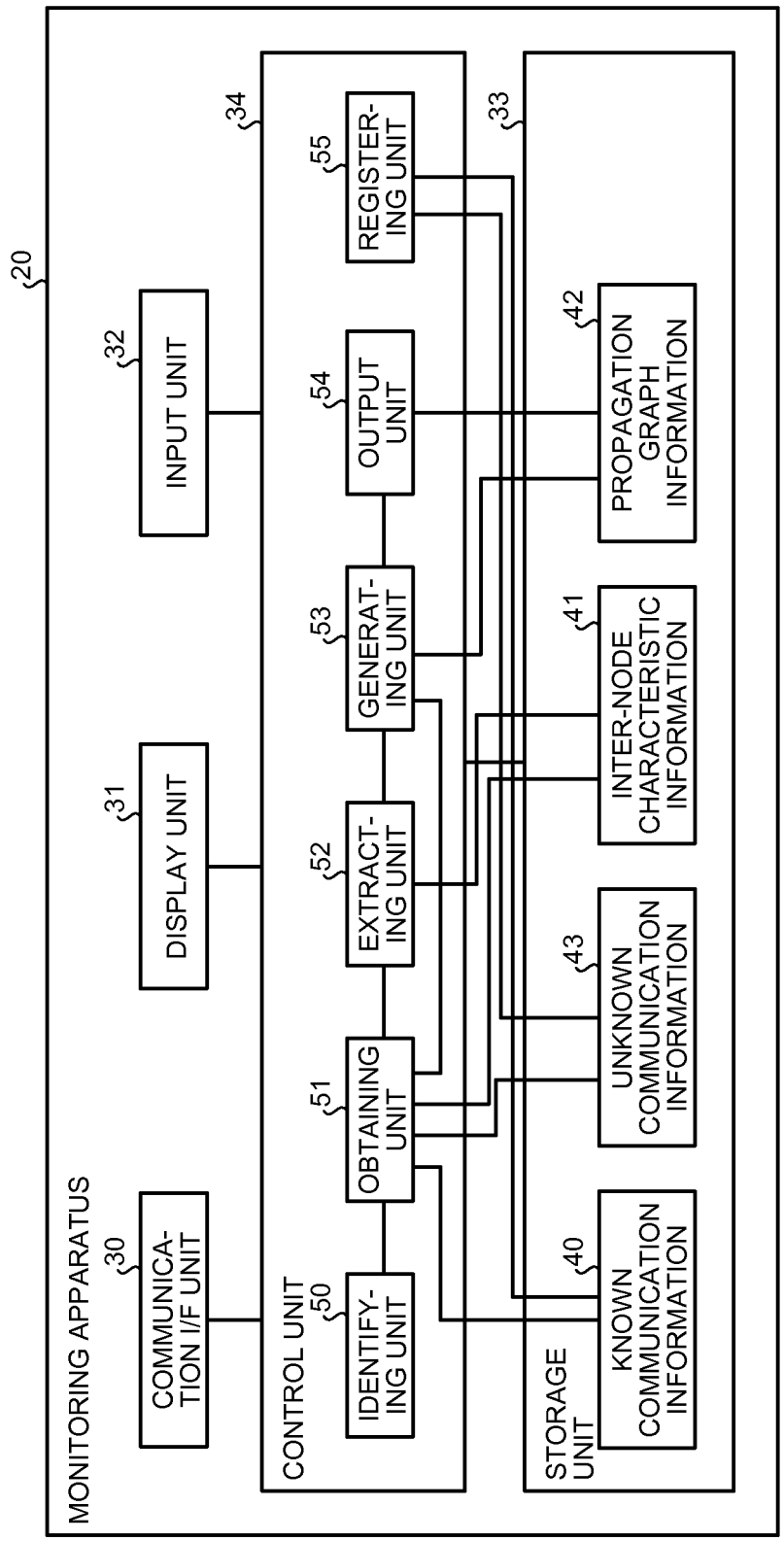
FIG. 20 is a block diagram illustrating a functional configuration of a monitoring apparatus according to a second embodiment.

FIG. 20 is a block diagram illustrating a functional configuration of a monitoring apparatus according to the second embodiment. To portions that are the same as those of the monitoring apparatus 20 according to the first embodiment illustrated in FIG. 2, the same signs will be appended, and portions different therefrom will be mainly described. As illustrated in FIG. 20, the storage unit 33 of the monitoring apparatus 20 further stores therein unknown communication information 43. Further, the control unit 34 of the monitoring apparatus 20 further has a registering unit 55.

Further, the propagation graph information 42 according to the second embodiment further stores therein information related to a transmission source and a transmission destination for which communication of an unknown pattern has been obtained.

FIG. 21 is a diagram illustrating an example of a data configuration of the propagation graph information. The propagation graph information 42 further has items therein, which are "communication characteristic transmission source", "communication characteristic transmission destination", and "communication characteristic obtainment time". The item, "communication characteristic transmission source", is an area storing therein an IP address of a transmission source for which a communication characteristic of an unknown pattern has been obtained. The item, "communication characteristic transmission destination", is an area storing therein an IP address of a transmission destination for which the communication characteristic of the unknown pattern has been obtained. "Communication characteristic obtainment time" is an area storing therein a time at which the communication characteristic of the unknown pattern was obtained. The items, "communication characteristic transmission source", "communication characteristic transmission destination", and "communication characteristic obtainment time", are registered by the generating unit 53.

Returning to FIG. 20, the unknown communication information 43 is data storing therein information related to unknown communication. For example, the unknown communication information 43 stores therein a transmission source, a transmission destination, and a time, at which unknown communication is performed.

FIG. 22 is a diagram illustrating an example of a data configuration of the unknown communication information.

A table having items, such as "transmission source IP", "transmission destination IP", and "unknown time list", which are associated with one another, may be used as the unknown communication information 43. The item, "transmission source IP", is an area storing therein an IP address of the communication device 12 that is the transmission source of data of unknown communication. The item, "transmission destination IP", is an area storing therein an IP address of the communication device 12 that is the transmission destination of the data of the unknown communication. The item, "unknown time list", is an area storing therein a time at which the unknown communication was performed. If unknown communication is occurring plurally between a transmission source and a transmission destination, this item, "unknown time list", stores therein each of their times. That is, in the item, "unknown time list", a plurality of times at which the unknown communication was plurally performed, are stored. An example of the data of the unknown communication information 43 will be described later.

The obtaining unit 51 regards communication between a transmission source and a transmission destination not stored in the known communication information 40, as communication of an unknown pattern, from the packets transmitted in the monitoring target system 10, and outputs the identified communication characteristic, together with the information indicating the transmission source, transmission destination, and time, to the obtaining unit 51. Further, the obtaining unit 51 registers, in the unknown communication information 43, the transmission source, transmission destination, and time of the unknown pattern.

Figure 23:
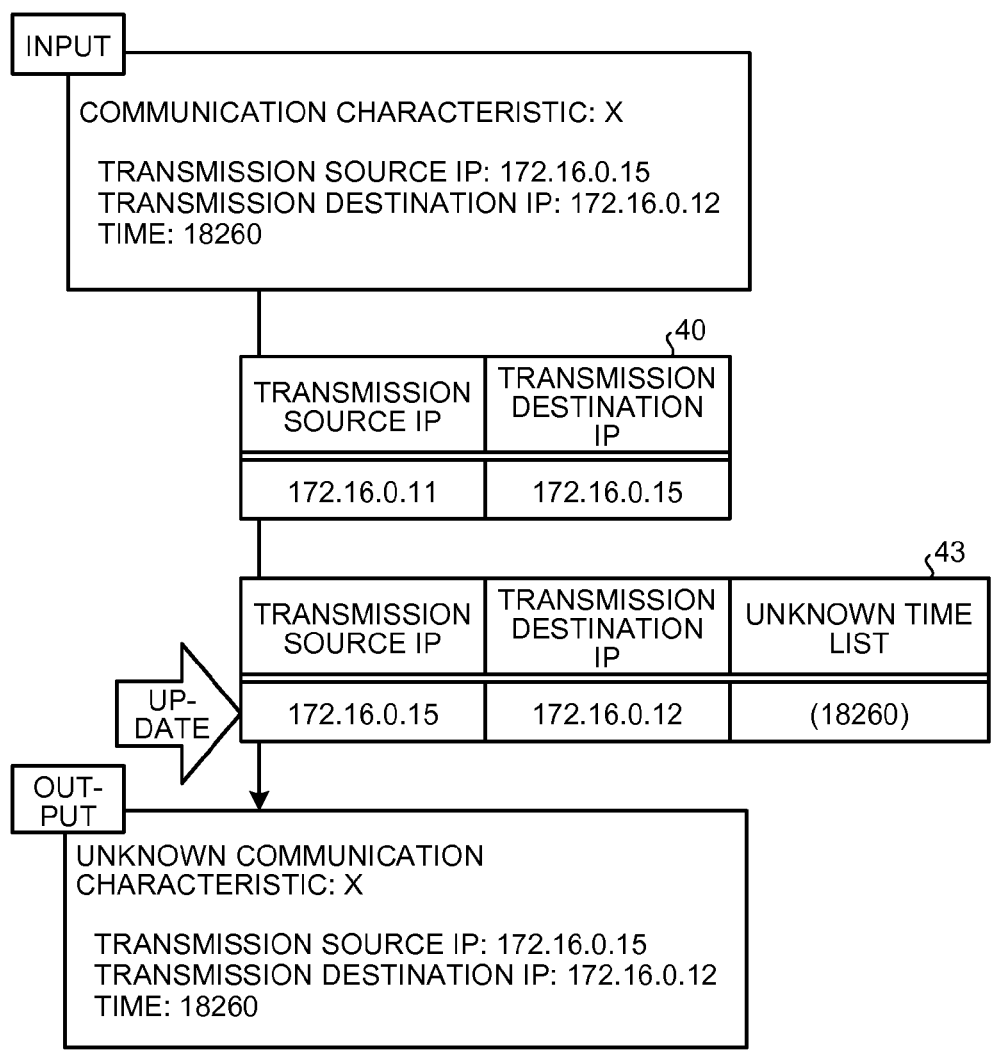
FIG. 23 is a diagram schematically illustrating a process for a case where a combination of a transmission source and a transmission destination is not stored in known communication information.

An example will now be described. FIG. 23 is a diagram schematically illustrating a process for a case where a combination of a transmission source and a transmission destination is not stored in the known communication information. As illustrated in FIG. 23, it is assumed that in the known communication information 40, a transmission source IP "172.16.0.11" and a transmission destination IP "172.16.0.15" have been stored. Further, in the example of FIG. 23, it is assumed that data, which are a communication characteristic "X", a transmission source IP "172.16.0.15", a transmission destination IP "172.16.0.12", and a time "18260", have been input. In this case, the obtaining unit 51 determines whether the combination of the transmission source IP "172.16.0.15" and transmission destination IP "172.16.0.12" has been stored in the known communication information 40. In this case, since that combination has not been stored in the known communication information 40, the obtaining unit 51 registers the transmission source, transmission destination, and time of the unknown pattern in the unknown communication information 43.

The generating unit 53 deletes a record having a time stored in the item, "last update time", the time being before the propagation monitoring time K, from the propagation graph information 42.

The registering unit 55 deletes, from the item, "unknown time list", of the unknown communication information 43, the time of the deleted record having the time that is before the propagation monitoring time K. If the item, "unknown time list", has become empty as a result of the deletion, the registering unit 55 registers the combination of the transmission source and transmission destination of the record with the item, "unknown time list", having become empty, in the known communication information 40. Further, the registering unit 55 deletes the record with the item, "unknown time list", having become empty. That is, the registering unit 55 registers, as being due to the communication of the existing system instead of being due to communication due to malware, the transmission source and transmission destination for which all of the unknown communications have gone through the propagation monitoring time K, in the known communication information 40.

Figure 24:
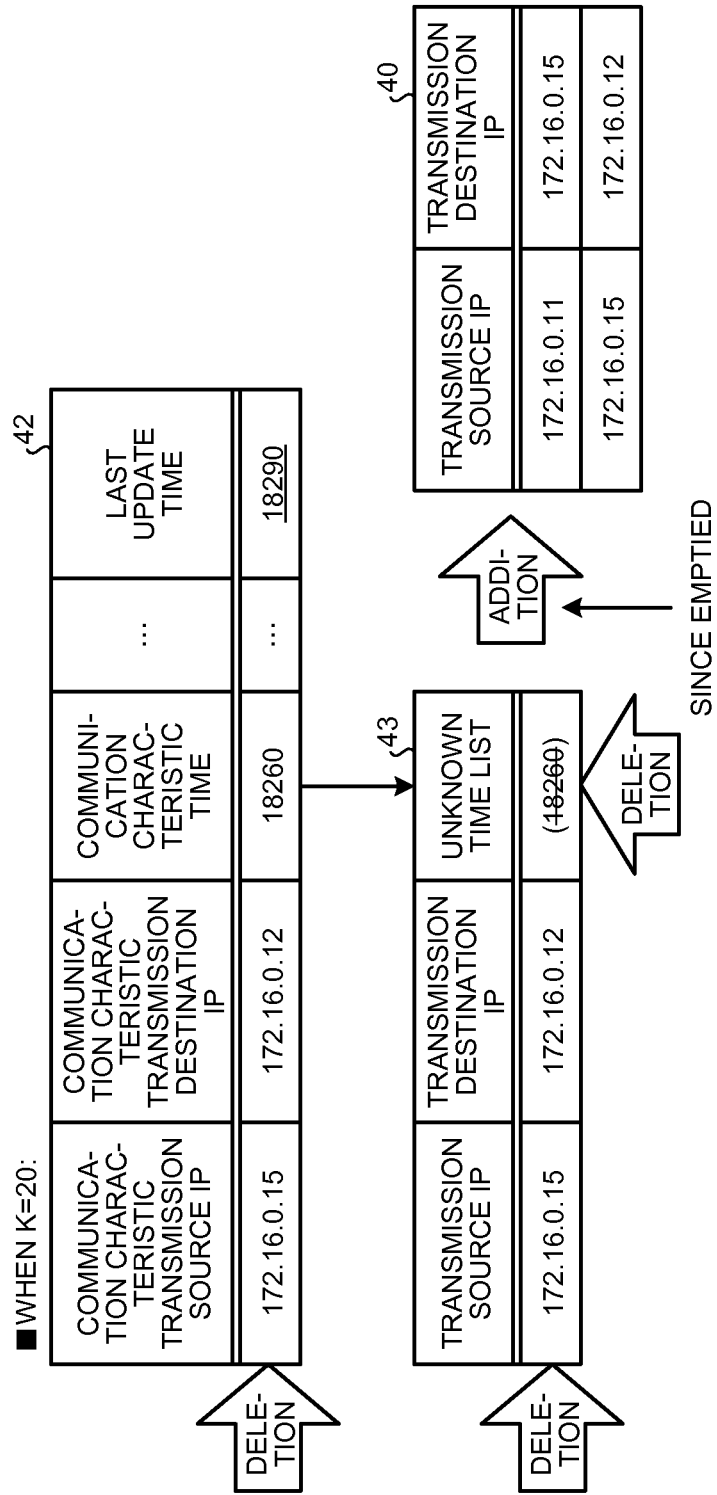
FIG. 24 is a diagram schematically illustrating a process for a case where a time is before a propagation monitoring time K.

An example will now be described. FIG. 24 is a diagram schematically illustrating a process for a case where the time is before the propagation monitoring time. In the example of FIG. 24, it is assumed that the last update time "18290" of the record with the communication characteristic transmission source "172.16.0.15" and the communication characteristic transmission destination "172.16.0.12" is before the propagation monitoring time K and is thus deleted. In this case, the registering unit 55 deletes "18260" from the item, "unknown time list" of the record with the transmission source IP "172.16.0.15" and the transmission destination IP "172.16.0.12" in the unknown communication information 43. If, as a result of the deletion, the item, "unknown time list" of the record with the transmission source IP "172.16.0.15" and the transmission destination IP "172.16.0.12" has become empty, the registering unit 55 additionally registers the transmission source "172.16.0.15" and transmission destination "172.16.0.12" in the known communication information 40.

As a result, the monitoring apparatus 20 is able to learn the communications of the existing system and register them in the known communication information 40.

Effects

As described above, the monitoring apparatus 20 according to this embodiment registers the transmission source and transmission destination for which the interval for obtaining the packets is equal to or greater than the predetermined interval in the storage unit 33. As a result, the monitoring apparatus 20 is able to learn the communications in the existing system and register them in the known communication information 40.

[c] Third Embodiment

The embodiments related to the disclosed apparatus have been described above, but the disclosed techniques may be embodied in various different modes, other than the above described embodiments. Thus, hereinafter, other embodiments included in the present invention will be described.

For example, in the above described embodiments, the case of identifying one communication characteristic has been described, but the disclosed apparatus is not limited to this. For example, a plurality of communication characteristics may be identified, and depending on whether each of the characteristics is included, whether or not propagation has occurred may be determined. In this case, for example, grouping into different levels may be performed by assuming that the more the communication characteristics are included, the greater the possibility of the propagation having occurred is, and the respective levels may be displayed in different modes.

Further, in the above described embodiments, the case where the packets of the data relayed by the switch 15 are mirrored and transmitted to the monitoring apparatus 20 has been described, but the disclosed apparatus is not limited to this. For example, information for identifying a communication characteristic may be extracted from a packet of data relayed by the switch 15 and transmitted to the monitoring apparatus 20. For example, a data size, a transmission source IP, a transmission destination IP, and a transmission destination port of a packet of data relayed by the switch 15 may be extracted and transmitted to the monitoring apparatus 20.

Further, in the above described embodiments, the case where the propagation state is displayed by the display unit 31 has been described, but the disclosed apparatus is not limited to this. For example, an operation instruction may be received from another terminal device and the terminal device may be caused to display the propagation state.

Further, in the above described embodiments, the case where the same communication characteristic as the communication characteristic of the unknown pattern is retroactively searched for upstream of the flow of the packet has been described, but the disclosed apparatus is not limited to this. For example, for a node where propagation has occurred, occurrence of propagation downstream from that node may be detected. That is, for a node where propagation has occurred, whether or not propagation has occurred may be determined according to whether or not a communication characteristic for another node other than a node retrieved as having the node where propagation has occurred as the transmission source also includes the communication characteristic of the unknown pattern.

Further, the respective components of each device are illustrated functionally and conceptually, and are not necessarily physically configured as illustrated. That is, a specific state of separation and integration of the respective devices is not limited only to that illustrated, and all or a part thereof may be configured by functionally or physically separating or integrating them in arbitrary units depending on various loads and use situations. For example, the respective processing units, such as the identifying unit 50, the obtaining unit 51, the extracting unit 52, the generating unit 53, the output unit 54, and the registering unit 55, may be integrated as appropriate. Furthermore, the processing by each of the processing units may be separated into processes of a plurality of processing units as appropriate. Further, each device may be formed by integrating a part or all of the respective processing units as appropriate. Moreover, all or an arbitrary part of the respective processing functions performed by the processing units may be realized by a CPU and a program analyzed and executed by the CPU, or may be realized as hardware by wired logic.

Monitoring Program

Figure 25:
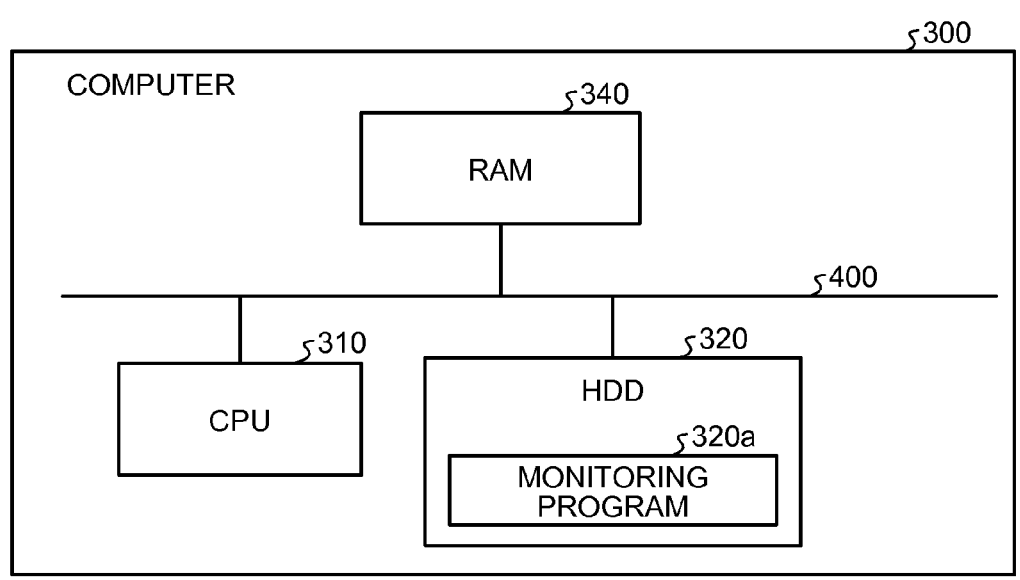
FIG. 25 is a diagram illustrating a computer that executes a monitoring program.

Further, the various processes described in the above described embodiments may also be realized by executing a program prepared beforehand, by a computer system, such as a personal computer or a work station. Accordingly, hereinafter, an example of a computer system that executes a program having functions similar to those of the above described embodiments will be described. FIG. 25 is a diagram illustrating a computer that executes a monitoring program.

As illustrated in FIG. 25, a computer 300 has a central processing unit (CPU) 310, a hard disk drive (HDD) 320, and a random access memory (RAM) 340. Each of these units 300 to 340 is connected via a bus 400.

The HDD 320 stores therein in advance a monitoring program 320a having functions similar to those of the respective processing units of the above described monitoring apparatus 20. The monitoring program 320a may be separated, as appropriate.

Further, the HDD 320 stores therein various information. For example, the HDD 320 stores therein various data used in the OS and the processing.

By the CPU 310 reading and executing the monitoring program 320a from the HDD 320, operations similar to those of the respective processing units of the embodiments are executed. That is, the monitoring program 320a executes operations similar to those of the respective processing units of the monitoring apparatus 20.

The monitoring program 320a may be not initially stored in the HDD 320.

For example, the program may be stored beforehand in a "portable physical medium", such as a flexible disk (FD), a CD-ROM, a DVD disk, a magneto-optic disk, an IC card, or the like, which is inserted in the computer 300. The computer 300 may then read and execute the program therefrom.

Furthermore, the program may be stored beforehand in "another computer (or server)", or the like, which is connected to the computer 300 via a public network, the Internet, a LAN, a WAN, or the like. The computer 300 may then read and execute the program therefrom.

According to an aspect of the present invention, a propagation state of an unknown pattern is able to be grasped.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process, the process comprising:
   obtaining, for each predetermined time period, from packets transmitted in a system, an obtained packet set with a combination of a transmission source and a transmission destination different from a predetermined combination of a transmission source and a transmission destination;
   identifying, for each predetermined time period, a communication characteristic of the obtained packet set;
   determining that the obtained packet set is related to an unknown pattern and extracting, for the each predetermined time period, from the packets transmitted in the system, a related packet related to the obtained packet set, wherein the extracting includes, when propagation of the unknown pattern has occurred, performing searching retroactively for an interval in which a communication including the propagation has occurred, and extracting the related packet that includes the communication characteristic and that is destined for the transmission source in which the propagation has occurred;
   generating, based on the extracted related packet, information indicating a degree of propagation of the unknown pattern; and
   wherein the transmission source and the transmission destination are registered in a storage unit when the transmission source and the transmission destination have an interval for obtaining a packet for the obtained packet set equal to or greater than a predetermined interval.

2. The non-transitory computer-readable recording medium according to claim 1, wherein the identifying a communication characteristic includes identifying any one or a plurality of: a frequency characteristic; a combination characteristic; and a series characteristic, as the communication characteristic.

3. The non-transitory computer-readable recording medium according to claim 1, wherein the obtaining includes obtaining a packet set with a combination of a transmission source and a transmission destination not stored in the storage unit storing therein a predetermined combination of a transmission source and a transmission destination between which a communication is performed in the system.

4. The non-transitory computer-readable recording medium according to claim 1, wherein the predetermined time period is determined correspondingly with a time period for malware to perform communication in order to attempt infection to another communication device.

5. The non-transitory computer-readable recording medium according to claim 1,
wherein the identifying includes, when identifying the communication characteristic for each predetermined time period, which overlaps the predetermined time period, starting identification of the communication characteristic for each predetermined time period, which is of a shorter cycle than the predetermined time period.

6. The non-transitory computer-readable recording medium according to claim 1,
wherein the registering includes deleting a time from an unknown time list item of a record with a transmission source IP and a transmission destination IP in unknown communication information, and when, as a result of the deletion, the unknown time list item of the record with the transmission source IP and the transmission destination IP has become empty, additionally registering the transmission source and the transmission destination in known communication information.

7. A monitoring method comprising:
obtaining, using a processor, for each predetermined time period, from packets transmitted in a system, an obtained packet set with a combination of a transmission source and a transmission destination different from a predetermined combination of a transmission source and a transmission destination;
identifying, for each predetermined time period, a communication characteristic of the obtained packet set;
determining that the obtained packet set is related to an unknown pattern and extracting, using a processor, for the each predetermined time period, from the packets transmitted in the system, a related packet related to the obtained packet set, wherein the extracting includes, when propagation of the unknown pattern has occurred, performing searching retroactively for an interval in which a communication including the propagation has occurred, and extracting the related packet that includes the communication characteristic and that is destined for the transmission source in which the propagation has occurred;
generating, using a processor, based on the extracted related packet, information indicating a degree of propagation of the unknown pattern; and
outputting, using a processor, the generated information,
wherein the transmission source and the transmission destination are registered in a storage unit when the transmission source and the transmission destination have an interval for obtaining a packet for the obtained packet set equal to or greater than a predetermined interval.

8. A monitoring apparatus comprising:
a processor, wherein the processor executes a process comprising:
obtaining, for each predetermined time period, from packets transmitted in a system, an obtained packet set with a combination of a transmission source and a transmission destination different from a predetermined combination of a transmission source and a transmission destination;
identifying, for each predetermined time period, a communication characteristic of the obtained packet set;
determining that the obtained packet set is related to an unknown pattern and extracting, for the each predetermined time period, from the packets transmitted in the system, a related packet related to the packet obtained set, wherein the extracting includes, when propagation of the unknown pattern has occurred, performing searching retroactively for an interval in which a communication including the propagation has occurred, and extracting the related packet that includes the communication characteristic and that is destined for the transmission source in which the propagation has occurred;
generating, based on the related packet extracted, information indicating a degree of propagation of the unknown pattern; and
outputting the information generated,
wherein the transmission source and the transmission destination are registered in a storage unit when the transmission source and the transmission destination have an interval for obtaining a packet for the obtained packet set equal to or greater than a predetermined interval.

* * * * *